(12) United States Patent
Campos et al.

(10) Patent No.: US 9,363,705 B2
(45) Date of Patent: *Jun. 7, 2016

(54) NETWORK CAPACITY REDISTRIBUTION WITH FREQUENCY RE-USE

(71) Applicant: Cable Television Laboratories, Inc., Louisville, CO (US)

(72) Inventors: Luis Alberto Campos, Superior, CO (US); Thomas Williams, Longmont, CO (US); Daniel Rice, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/274,512

(22) Filed: May 9, 2014

(65) Prior Publication Data

US 2014/0243007 A1 Aug. 28, 2014

Related U.S. Application Data

(63) Continuation of application No. 13/532,970, filed on Jun. 26, 2012, now Pat. No. 8,725,158.

(51) Int. Cl.
| | |
|---|---|
| *H04W 28/02* | (2009.01) |
| *H04W 28/08* | (2009.01) |
| *H04W 16/04* | (2009.01) |
| *H04W 16/08* | (2009.01) |

(52) U.S. Cl.
CPC .......... *H04W 28/0289* (2013.01); *H04W 16/04* (2013.01); *H04W 28/08* (2013.01); *H04W 16/08* (2013.01)

(58) Field of Classification Search
CPC . H04W 16/04; H04W 16/08; H04W 28/0289; H04W 28/08; H04W 4/005; H04W 84/04; H04W 24/00; H04L 27/2601; H04L 27/2608
See application file for complete search history.

(56) References Cited

U.S. PATENT DOCUMENTS

| | | | | |
|---|---|---|---|---|
| 6,473,447 | B1* | 10/2002 | Strich et al. | 375/130 |
| 7,162,203 | B1* | 1/2007 | Brunner | 455/63.1 |
| 8,725,158 | B2* | 5/2014 | Campos et al. | 455/445 |
| 2007/0211617 | A1* | 9/2007 | Geile et al. | 370/203 |
| 2009/0245783 | A1 | 10/2009 | So | |
| 2010/0306372 | A1 | 12/2010 | Gorman | |
| 2011/0255859 | A1 | 10/2011 | So | |
| 2013/0121131 | A1* | 5/2013 | Dapper et al. | 370/210 |

* cited by examiner

*Primary Examiner* — Diane Mizrahi
(74) *Attorney, Agent, or Firm* — Great Lakes Intellectual Property, PLLC.

(57) ABSTRACT

Redistribution of network capacity in a network having a plurality of base stations is contemplated. The redistribution may include reallocating or otherwise reusing primary channels assigned to the plurality base stations to increase capacity proximate one or more of the base stations. The network capacity may be increased in this manner without having to add new base stations.

20 Claims, 4 Drawing Sheets

NETWORK CAPACITY REDISTRIBUTION WITH FREQUENCY RE-USE

CROSS-REFERENCE TO RELATED APPLICATIONS

This application is a continuation of U.S. application Ser. No. 13/532,970, now U.S. Pat. No. 8,725,158 filed Jun. 26, 2012, the benefit and disclosure of which is claimed and incorporated in its entirety by reference herein.

TECHNICAL FIELD

The present invention relates to managing network capacity, such as but not necessarily limited to redistributing network capacity with frequency re-use.

BACKGROUND

Bandwidth requirements across a geographical area can be very uneven. A busy intersection, a commercial area or a special temporary event such as a parade, a race or an outdoor community activity can generate a higher demand on capacity resources. The cellular industry has addressed this higher demand of capacity by adding more base stations and smaller cell sites. Adding more cells is a practical solution when the increase in demand is expected to be constant. Sometimes, however, the change in capacity demand is more dynamic and sometimes it is difficult to place base stations at optimum locations because of zoning restrictions or even geographical impediments. Accordingly, a need exists to facilitate network capacity redistribution without having to add permanent cell sites or other infrastructure.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
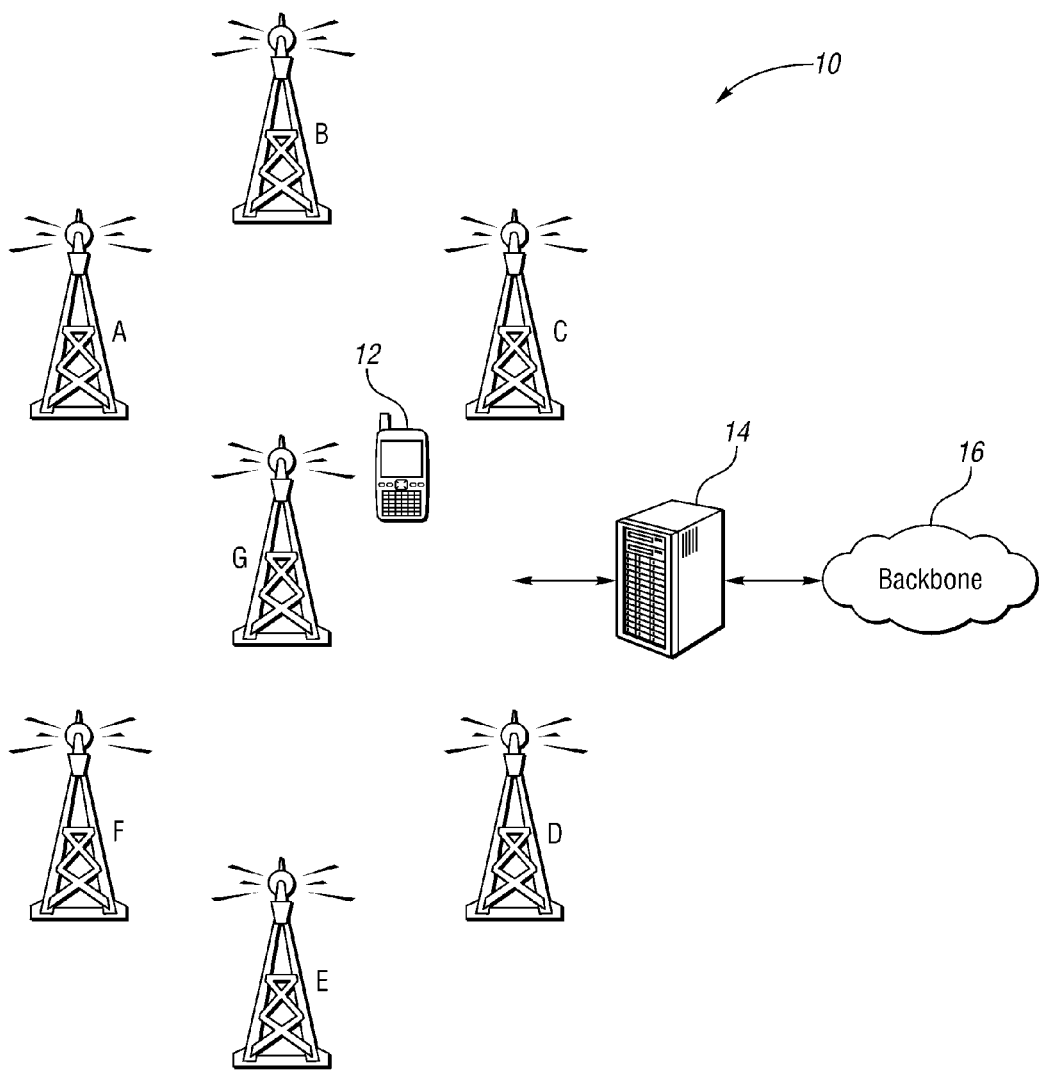
FIG. 1 illustrates a network-based system in accordance with one non-limiting aspect of the present invention.

FIG. 1 illustrates a network-based system 10 in accordance with one non-limiting aspect of the present invention. The system 10 is illustrated for exemplary non-limiting purposes with respect to a cellular network having a plurality of base stations A, B, C, D, E, F, G configured to facilitate signal exchange with a mobile device 12, such as but not necessarily limited to a cellular phone or a mobile computer having cellular capabilities. The illustrated cellular configuration may be useful in facilitating cellular communications according to frequency division multiple access (FDMA), code division multiple access (CDMA), polarization division multiple access (PDMA), single-carrier FDMA (SC-FDMA) and/or time division multiple access (TDMA). The system 10 may also be configured to facilitate other types of wireless or wireline networking, such as but not necessarily limited to supporting Wi-Fi, WiMax, etc. The plurality of base stations A, B, C, D, E, F, G may be configured to facilitate upstream and downstream signaling by way of an aggregating unit 14 and a backbone network 16. The backbone network 16 may exchange signals with other base stations (not shown) or other types of endpoints (not shown). The signaling carried over the network 16 may be sufficient to conduct voice communications, high speed date exchanges, and other electronic services.

The base stations A, B, C, D, E, F, G may be configured with one or more antennas to facilitate wireless communications with the device 12 and/or each other A, B, C, D, E, F, G. The antennas may be directional and/or omnidirectional. The aggregating unit 14 may be configured to facilitate upstream and downstream signaling between the backbone 16 and each of the base stations A, B, C, D, E, F, G, and in some cases between the base stations themselves A, B, C, D, E, F, G, e.g., such as when the originating and terminating endpoints of a phone call are in close proximity to each other. The aggregating unit 14, the device 12, the base stations A, B, C, D, E, F, G, and/or some other unit in communication therewith may include a computer-readable medium having stored therein code which when executed with a processor implement a method of managing network capacity of the system 10 according to the operations contemplated by the present invention. The aggregating unit 14 is described for exemplary purposes as being tasked with managing network capacity. It may achieve the contemplated management by instructing or otherwise controlling the base stations A, B, C, D, E, F, G and/or the mobile device 12 to operate according to various communication requirements.

The communication requirements may be used to specify channels (e.g. frequencies), timing, amplitudes, power levels, and etc. at which signals are to be exchanged between the base stations A, B, C, D, E, F, G and the mobile device 12. These parameters may be individually determined for each of the base stations A, B, C, D, E, F, G and/or the mobile device 12 such that some base stations A, B, C, D, E, F, G facilitate signal communications according to a certain set of parameters while others facilitate signal communications according to a different set of parameters. The present invention is described with respect to specifying the various communication requirements relative to operation of the plurality of base stations A, B, C, D, E, F, G and only a single mobile device. This is done with the understanding that similar operations may be performed to facilitate concurrently controlling signaling parameters for any number of base stations A, B, C, D, E, F, G and any number of mobile devices 12. The present invention is also predominately described with respect to the base stations A, B, C, D, E, F, G and the mobile device 12 communicating in a bi-directional manner with simultaneous upstream and downstream signaling. This is done with the understanding signaling parameters may be specified to facilitate one-direction communications, e.g., push-to-talk.

Figure 2:
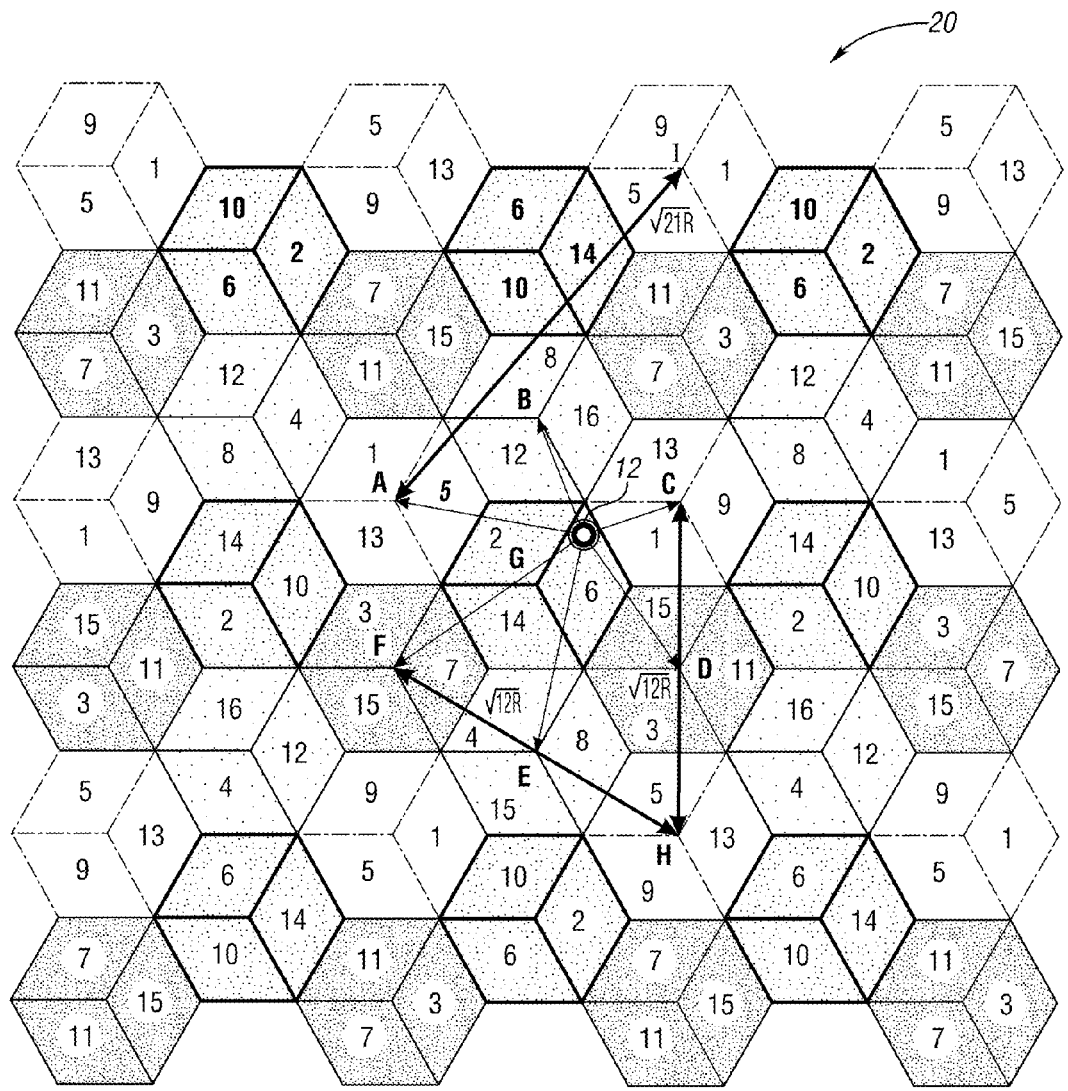
FIG. 2 schematically illustrates a coverage area of a cellular network in accordance with one non-limiting aspect of the present invention.
Figure 3:
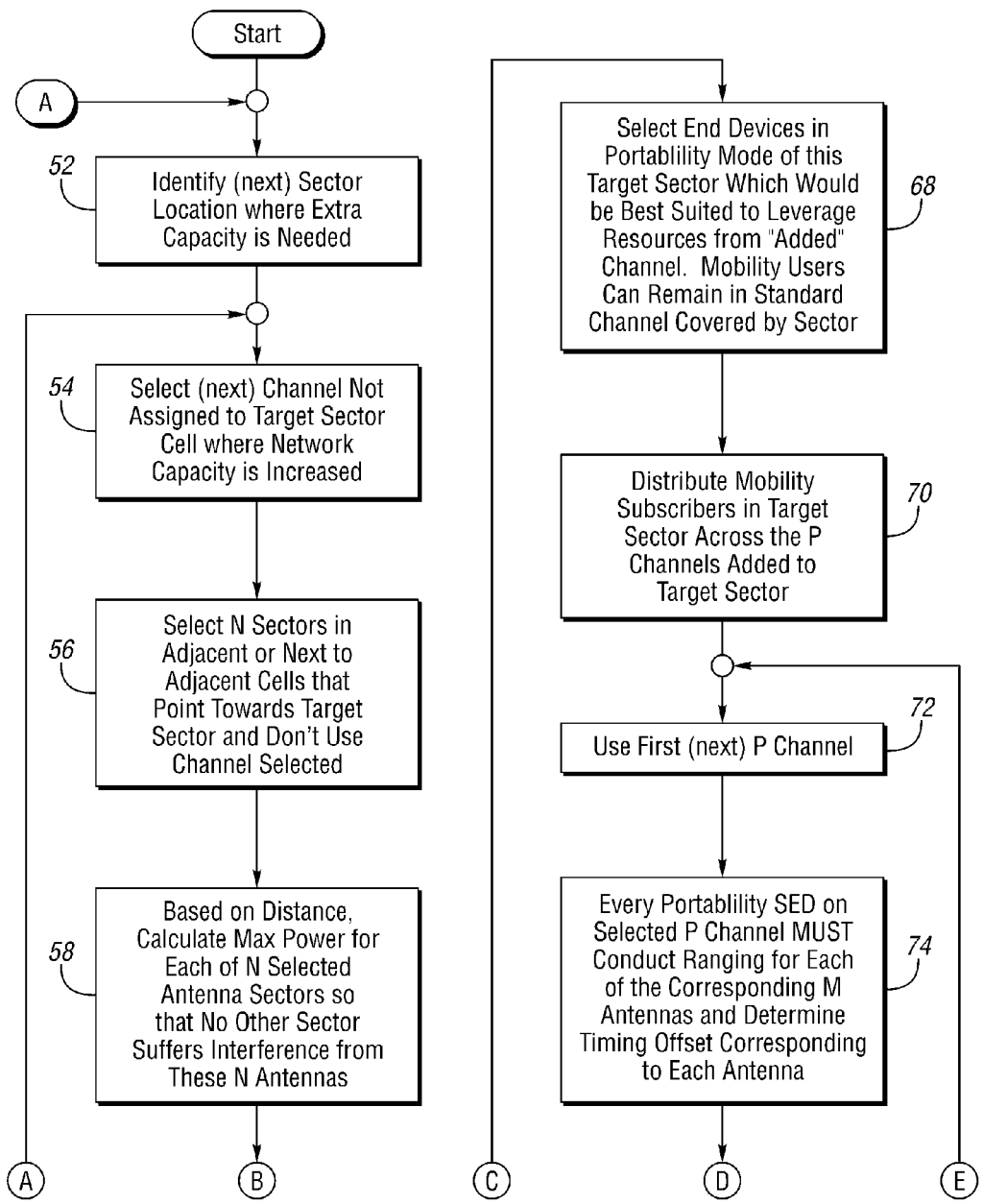
FIG. 3 illustrates a flowchart of the method of redistributing network capacity with frequency reuse in accordance with one non-limiting aspect of the present invention.
Figure 3:
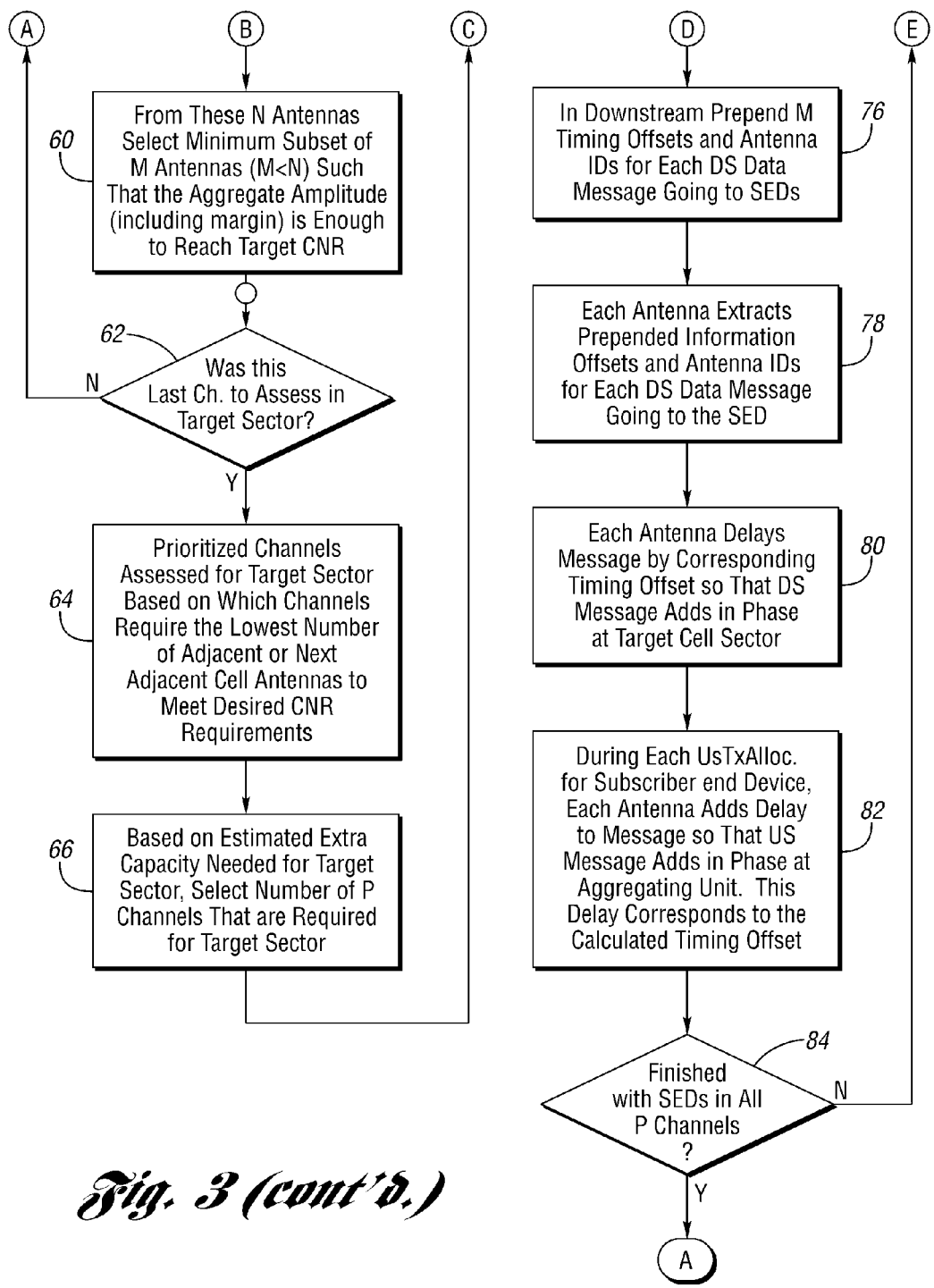

FIG. 2 schematically illustrates a coverage area 20 of a cellular network in accordance with one non-limiting aspect of the present invention. The coverage area 20 illustrates a wireless range of the plurality of base stations A, B, C, D, E, F, G shown in FIG. 1 and for a plurality of additional base stations. Each of the illustrated base stations corresponds with a center of one of the hexagons (the corresponding coverage area is not necessarily hexagon in shape—it may have another shape or pattern). The base stations may be tasked with supporting wireless signaling for a particular area proximate to it. FIG. 2 illustrates each illustrated base station being arranged into cells shaped as hexagons and having antennas sufficient to facilitate dividing the cells into 120° sectors where each sector of the same cell corresponds with a different channel. The use of hexagon shaped cells is provided for exemplary non-limiting purposes as the present invention fully contemplates the base stations A, B, C, D, E, F, G or other wireless or wireline nodes used to facilitate signaling within the network being arranged in a different manner and particularly with different antenna shapes, types an configurations.

Each of the sectors is shown to include a reference numeral in order to indicate a wireless channel transmitted within that sector. The numerically represented channels may be characterized as a primary channel of each sector, or more specifically, the channel for which the sector is to use for most if not all of its communications. The corresponding antenna may predominately facilitate communications over the numerically represented channel. Each channel may correspond with a particular frequency range or band of frequencies at which communications are preferred. The channel assigned to each sector may be determined by the aggregating unit 14 or other network management entity. The amplitude, power, and other signaling characteristics associated with the signaling of each sector may be similarly controlled by the aggregating unit 14 or other network management entity. The channel assigned to each sector may be determined according to certain signaling characteristics in order to limit or ameliorate signaling from one sector interfering or otherwise undesirably influencing signaling of another sector.

Each sector may be able to support a certain amount of signaling, which may be proportional to the activities of the mobile device(s) that is(are) operating within that sector. If multiple mobile devices are being simultaneously used within a sector, that sector may experience a certain number of individuals attempting to make phone calls. Should the number of phone calls or other cellular dependent services consumed by the individuals exceed a maximum or desired bandwidth, additional resources may be desired in order to allow that overloaded sector to support additional services. One non-limiting aspect of the present invention proposes that in the event of such a shortage in capacity, instead of adding a base station and reducing the size of cell sites, which is contemplated, additional channels can be reused by coordinating the transmission of signals through multiple antennas in and towards the area where the additional capacity is required. This approach could also be used to adapt to the geographical unevenness in capacity demand using a fairly even distribution of antennas.

FIG. 2 illustrates an overload condition within a sector of cell G transmitting over channel 6, referred to as sector 6, which is shown relative to the mobile device 12. A selection of antennas neighboring the target may be redistributed through the frequency reuse contemplated by the present invention to facilitate increased capacity within the overloaded sector. This may be accomplished by instructing base stations neighboring sector 6 of cell G, e.g. cell towers A, B, C, D, E, and F (cell A uses channel 5 as its primary channel in the sector adjoining cell G such that it is assumed that 5 is serving limited number of people and its resources can be shifted to cell G) to broadcast over additional channels, which may be referred to as a secondary channel as they operate in addition to a primary channel to which the corresponding sector is to predominantly communicate. The neighboring or supporting antennas can be arranged to form part of an antenna array to be fed the same signal in order to alleviate the burdens on the overloaded sector. This multi-antenna configuration results in an aggregate signal of high intensity and high capacity in the target area. Fine tuning of the appropriate delay and amplitude levels relative to each of the supporting antennas can be calculated to facilitate maintaining desired signaling levels.

One non-limiting aspect of the present invention contemplates the aggregating unit 14 being configured to facilitate assessing overload conditions and redistributing network resources to ameliorate the overload condition. In particular, the aggregating unit 14 may be configured to instruct the supporting cells to begin transmitting over one or more secondary channels, i.e., channels in addition to the primary channels already being transmitted from the corresponding cell. The selection of the supporting cells and the signaling strengths associated therewith may be controlled by the aggregating unit 14 to limit interference with other cells. One parameter of particular consideration when assigning the supporting cells is a frequency reuse distance. The frequency reuse distance generally corresponds with the distance between a cell broadcasting over a certain channel and a next closest cell broadcasting over the same channel.

The frequency re-use distance may be related to a distance in which the same channel can be re-used because it is deemed that there is sufficient separation relative to the next closest cell broadcasting over the same channel to prevent the transmission of one base station from overly impacting the next closest cell tower. FIG. 2 illustrates an intent to increase the capacity in the vicinity of the target symbol 12 by re-using channel 5 from supporting base stations A, B, C, D, E, F, G that are in close proximity (the added channel 5 is represented with the arrowed lines emanating from the target). The channel 5 may be considered to be re-used when broadcasted as a secondary channel or in addition to the cell's primary channel. The frequency reuse distance corresponds the distance between cell A and cell I. This distance is measured to be $\sqrt{21}R$, where R is the cell radius. From the supporting base stations A, B, C, D, E, F, G, only cell A is assigned to use channel 5 under the traditional frequency plan, i.e., cell A is only one of these cells having its primary channel as channel 5.

In the exemplary illustration, there may be six cells (A, B, C, D, E, F) that will be transmitting on channel 5 in addition to cell G in order to generate the antenna array to support frequency reuse within sector 6 of cell G. Optionally, less than all six of these cells may be necessary to transmit on channel 5 and achieve suitable power levels. The signaling power levels and other signaling characteristics for transmissions over channel 5 of the supporting cells A, B, C, D, E, F, G may be adapted, as described below in more detail, in order to facilitate desired signaling with the mobile device 12. Channel 5 transmission from cells C and F affect cell H that also transmits on channel 5. The distance from C and F to H is in both cases is equal to $\sqrt{12}R$. Since the radiated power from an antenna varies proportionally to $1/r^2$, it is known that at the frequency re-use distance for transmission at the same channel should not unduly interfere with the system performance. Therefore it is known that at $r=\sqrt{21}R$ the impact on performance will be negligible. The maximum acceptable aggregate power level from interfering sources of r is proportional to $$\frac{P_o}{21R^2},$$

given by the following equation.

$$P \propto \frac{P_o}{21R^2}$$

If the transmit power of cells C and F is equal to $P_1$, then the aggregate power of C and F reaching cell H is proportional to the following equation.

$$P(h) = \frac{2P_1}{12R^2} = \frac{P_1}{6R^2}$$

In order for the power incident on cell H from C and F to be considered negligible, the following equation must hold.

$$\frac{P_0}{21R^2} \geq \frac{P_1}{6R^2}$$

$$P_1 \leq \frac{6P_o}{21}$$

or about $P_1 \leq 0.285\ P_0$. A transmit power value of 0.25 $P_0$. For C and F cells ensures a good margin to avoid interference with cell H. Other cells, which are located further from cell H can transmit at higher power levels without impacting cells with channel 5 as its primary channel—cells C and F are shown as worst case scenarios in the exemplary illustration.

While the power level varies as $1/r^2$, the amplitude varies as $1/r$. From FIG. 2 it is shown that to have acceptable performance the aggregate amplitude level should be not lower than what is received at the edge of a single antenna approach (i.e., according to the primary channel distribution). If the transmit amplitude corresponding to a transmit power of $P_0$ is $A_0$ then the amplitude at the edge of the cell and the minimum suitable level has to be proportional to $A_0/R$. The amplitude is proportional to square root of the power, so for C and F cells in terms of amplitude their transmit amplitudes equal to $A_1 = 0.5\ A_0$, where $A_0$ is proportional to the typical transmit amplitude level of a cell that results in good performance within the cell. There may not be any place a restriction on amplitude levels on cells A,B,D,E,G since they could in principle be at level of $A_0$. The distances from the different cells to the target area is in all cases less than 2.5R and can be as low as R. Conservatively, it may be desirable to assume the worst case distance to be 3R for all cells. The resulting aggregate amplitude (A) from all the selected 7 cells at an amplitude proportional to $A_0/2$ is equal to $$A = 7\frac{\frac{A_0}{2}}{3R} = \frac{7A_0}{6R}$$

which is greater than $A_0/R$, ensuring good performance using channel 5. Optionally, use of the actual distances, rather than relying on assuming worst case scenarios for all cells, may result either in higher power (better performance) and/or in the need for lower number of cells.

In this example, without the need to shut down a channel to avoid interference, the capacity of channel 5 can be added to the targeted sector 12 in cell G even though it was not a channel that in a traditional frequency plan would have corresponded to cell G, i.e., channel 5 was not the primary channel within corresponding portion of cell G.

The network capacity redistribution using frequency reuse approach contemplated by the present invention requires multiple copies of the same signals to be transmitted between the supporting cells A, B, C, D, E, F, G and the mobile device 12. In other words, in the event the mobile device is used to conduct a voice call, the same segment of the voice call, considered to be the same signals, must be transmitted differently between the cells A, B, C, D, E, F, G and the mobile device in order to ensure a proper transmission within the system. Generally, this may correspond with adjusting an amplitude and/or timing of each of the signals as transmitted respectively between the cells A, B, C, D, E, F, G and the mobile device 12 in order to ensure the signals are received in-phase and/or synchronized at the aggregating unit 14. The synchronized signals may be more beneficial when the signals coming from all the antennas add constructively, i.e., not only the carrier being in-phase but the symbols with information also being aligned. This may include the mobile device 12 adjusting an amplitude and timing of upstream signaling sent to one cell relative to those sent to another cell in order to ensure the signals are received at the aggregating unit at the same time, i.e., in-phase. (This can be particularly beneficial in preventing echoes and other audible disruption during a phone call.) Similarly, the aggregating unit 14 may adjust amplitude and timing of downstream signals sent to one cell for communication to the mobile device 12 relative to those same signals sent to another cell for communication to the mobile device 12 in order to insure the downstream signals are received at the mobile device 12 from each of the cells A, B, C, D, E, F, G at the same time, i.e., synchronized.

The aggregating unit 14, the mobile device 12, or some other entity associated with the network may be configured to issue instructions sufficient to facilitate instructing the selected antenna elements of the cells and/or mobile device to control their amplitude and delay so that the signaling adds up constructively at the targeted region. This may include performing a ranging routine that accommodates for the multi-antenna array used to support channel 5. Accordingly, each of the receivers in the upstream direction or the transmitters in the downstream direction may be instructed to adjust its timing or delay offset and/or its amplitude/power in order to maintain signal integrity across the entire multi-antenna array.

Following this process of determining for a given sector within a cell a secondary channel which may be added, a group of antennas may be selected such that they transmit at power levels low enough that the aggregate interference does not duly impact any nearby cell using the added channel, e.g., the interference is less than the threshold associated with disrupting communications of the nearby cells. The transmit power, however, may be selected to be strong enough so that the aggregate amplitude from all selected is equivalent or greater than what is typically achieved if channel 5 were a primary channel of cell G. Optionally, a lookup table can be designed so that for different sectors certain channels can be added when a fixed set of neighboring channels operate within a specific transmit power range. This may include reviewing the primary channels of each cell and calculating the capability of each sector to facilitate various secondary channels. Each sector may support a secondary channel (or more channels) that is common to one or more of the primary channels of the other sectors such that the lookup table may be comprised of each primary channel the connected to a second or channel for a given sector.

Block 52 relates to identifying a sector location where extra capacity may be needed. This may include identifying an overloaded sector or a sector that is otherwise determined to require additional capacity in the future, such as in advance of an event which is likely to result in exceeding a desirable level for that sector. Block 54 relates to assessing one or more secondary channels that may be used within the overloaded sector, which may be referred to as an overloaded channel. The secondary channel may be selected to operate simultaneously with a primary channel already being used within the overloaded sector. The secondary channel may be selected from a plurality of available channels to correspond with a secondary channel that is least likely to influence neighboring base stations. While it is preferable to select a secondary channel that is least likely to interfere with neighboring base stations, it is not necessarily required that the chosen secondary channel be the least likely to interfere as some cases may warrant use of other channels, such as if the least likely channel is already in use as a secondary channel by another neighboring base station being used to provide increased capacity to another area. One optional requirement for selecting a secondary channel may be that a base station cannot broadcast a secondary channel that is the same as one of its primary channels, unless it is intended for re-enforcement of a weak primary channel. (In the illustrated scenario, cell A has channel 5 as a primary channel, but it is assumed that that sector has little traffic and suitable for redistribution such that a small portion of channel 5 capacity is intended for cell A on channel 5 while a larger portion is intended for the re-distribution of capacity into cell G.)

Block 56 relates to selecting an N number of sectors having capabilities to point signals towards the overloaded sector, i.e., those which are adjacent or in the proximity of the overloaded cell. The neighboring and overloaded sectors may be referred to collectively as supporting sectors. The selected number of supporting sectors may correspond with the signal strength at which those sectors are able to broadcast the overload channel without unduly interfering with other neighboring sectors. If sectors are available to transmit at higher power levels, then less sectors may be chosen to broadcast the overload channel, whereas if the sectors are limited in the amount power that can be used, more sectors may be chosen to broadcast the overload channel, i.e., to achieve a desired minimum power threshold. Block 58 relates to calculating the maximum power for each of the N cells at each of the possible secondary channels. Block 60 relates to selecting a minimum subset of M antennas from the available number of antennas to be used in actually broadcasting the overload channel. This selection may be based on a desired carrier to noise ratio (CNR) for the corresponding aggregation of the related signaling. Block 62 relates to assessing whether additional channels are required to properly support the overloaded sector. If additional channels are desired, a similar process is repeated in order to create a second overload channel. If no additional channels are necessary, the process proceeds.

Block 64 relates to prioritizing the overload channels available for supporting the overloaded sector. This may occur, for example, in the event multiple overload channels are available and some assessment needs to be completed in order to allocate use of the supporting sectors according to a prioritized order of the overload channels. This may include arranging the sectors to support certain channels depending on a combination which results in use of the lowest number of supporting cells to meet the desired signaling requirements for each of the overload channels. Block 66 relates to selecting a P number of overload channels that are required to support the overloaded cell, i.e., the number of overloaded channels that may be needed such that a sufficient number of overload channels are provided to meet the actual or expected bandwidth requirements. In order to simplify the explanation set forth herein, it is assumed that a single overload channel is to be created. Block 68 relates to notifying end devices, i.e. the mobile devices, which are to begin broadcasting over the overload channel relative (portability mode) to those devices that are to maintain broadcasting over one of the primary channels (mobility mode).

Block 70 relates to allocating the mobile devices to communicate over the available overload channels and and/or the primary channels depending on the determinations made above with respect to whether the device is allocated to the portability mode or the mobility mode. The mobile devices may be instructed in advance of entering a phone number or taking other action that requires consumption of signaling over the overload channel. This may require the corresponding mobile device to take appropriate action to assure signals are transmitted synchronized across the array of antennas to be used in supporting signaling. Block 72 relates to identifying the first one of the P number of overload channels to be used for certain device is within the overloaded sector. Block 74 relates to those devices which are to begin transmitting over the selected one of the P number of overload channels to conduct a ranging operation or related operations sufficient to assess timing offsets and other signaling characteristics reflective of its distance from each of the sectors with which it will be supporting the overload channel.

Block 76 relates to prepending timing offsets and antenna IDs for downstream signaling, i.e. signaling originating from the backbone and traveling through the aggregating unit for distribution to each of the supporting sectors for final synchronized receipt at the mobile device. The antenna IDs may be used to identify the supporting antennas that are to be used in transmitting the signals and the timing offsets may be used to identify relative timing between each of the antennas for which each antenna is to broadcast a signal in order to ensure receipt at the mobile device in phase. Block 78 relates to each of the supporting antennas extracting the prepended information prior to transmitting the latest signaling to the mobile device. Block 80 relates to the supporting antennas delaying transmission signaling in order to ensure the downstream signals add in phase at the overloaded sector, i.e. at the corresponding mobile device. Block 82 relates to the mobile device performing a similar process of adjusting timing and/or amplitude in order to ensure the signals that are communicated from the mobile device to each of the supporting antennas arrive at the aggregating unit in phase. Block 84 relates to repeating the process for each mobile device that is to transmit over the same or different one of the P number of available overload channels.

As supported above, a cellular network may be configured in accordance with the present invention to be able to feed different antennas. A cable TV network can also be used to feed the selected antennas. In the case of a cable network using a centralized distribution system, like a CMTS, it may be easier to coordinate the transmission of the required signal to implement the schemes for the re-distribution of capacity using ranging capabilities of DOCSIS. These mechanisms may be leveraged to perform the synchronization needed. Since it may be possible that all antennas are fed by the same CMTS, multicasting can also be leveraged for the implementation of such a system. The wireless technology doesn't have to be limited to cellular technology but can also include WiFi, WiMAX and other wireless technologies. The various antenna array formation as contemplated by the present invention can be very dynamic and the capacity enhancement per location can adaptively follow the capacity needs, i.e., without having to provide a permanent base station or other infrastructure.

The invention is predominately described above with respect to use of a tri-sector cellular network. However, this methodology also applies to a 6-sector implementation or any type of sectorization. This methodology also applies with un-sectorized systems. If beam-forming is used, the redistribution of capacity can be more effective as the energy to the desired target area can be accurately directed and the unwanted illumination to a cell site can be avoided. The present invention is not necessarily limited to adding a new channel to a cell but can also be used to enhance the efficiency of the cell capacity, such as if the cell may be that at the edge of the cell or because of a geographic characteristic a portion of the cell operates at less than optimal conditions. For example the cell may be operating in 16QAM mode rather than 64QAM mode such that adding the contribution of additional signal synchronized can boost the signal and enhance the efficiency of data transport.

One non-limiting aspect of the present invention contemplates a methodology that adds capacity in cellular networks leveraging the use of multiple antennas controlling signal amplitude and delay to achieve an enhanced signal in sector beyond traditional frequency re-use plan. Various benefits may be achieved with the present invention, including an ability to: optimize capacity usage in cellular and non-cellular networks, both in opening additional frequency channel as well as to enhance performance in the frequency channels already being used; dynamically support short term capacity needs; enhance coverage in the event of a geographic impediment or due to restrictive zoning regulations; leverage cable distribution networks for the implementation of cellular services that are more efficient than traditional cellular configurations; and enhance in-building wireless capacity by coordination of access points While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
 a plurality of cells configured to each facilitate network communications over one or more of a plurality of channels, each cell having a plurality of sectors over which at least one of the plurality of channels is communicated;
 a unit with a computer-readable medium having a plurality of non-transitory instructions operable therewith to facilitate redistribution of network capacity associated with the plurality of channels, the non-transitory instructions being sufficient for:
 i) determining an overloaded sector of the plurality of sectors, the overloaded sector communicating over a first channel of the plurality of channels prior to an overload period;
 ii) instructing the overloaded sector to communicate over the first channel and a second channel of the plurality of channels during the overload period;
 iii) instructing supporting sectors proximate to the overloaded sector to communicate over the second channel during the overload period; and
 iv) instructing a device within the overloaded sector to simultaneously communicate with the supporting sectors and the overloaded sector over the second channel during the overload period.

2. The system claim 1 wherein the non-transitory instructions are sufficient for instructing the device to implement upstream parameters for upstream communications over the second channel, the upstream parameters specifying conditions at which upstream signals from the device are to be communicated over the second channel in order to be received with synchronization.

3. The system of claim 2 wherein the non-transitory instructions are sufficient for defining the upstream parameters to specify relative timing for the device to transmit the upstream signals to each of the supporting sectors and the overloaded sector.

4. The system of claim 2 wherein the non-transitory instructions are sufficient for defining the upstream parameters to specify an amplitude at which the device transmits the upstream signals to each of the supporting sectors and the overloaded sector.

5. The system of claim 4 wherein the non-transitory instructions are sufficient for limiting the amplitudes at which the devices transmits the upstream signals over the second channel to prevent unduly interfering with a next closet sector transmitting at the same frequency as the second channel, the next closest sector being one of the plurality of sectors not instructed to communicate with the device over the second channel during the overload period.

6. The system of claim 1 wherein the non-transitory instructions are sufficient for instructing the supporting sectors and the overloaded sectors to transmit the second channel at power levels below an interference threshold in order to avoid unduly interfering with a next closest sector transmitting at the same frequency as the second channel, the next closest sector being one of the plurality of sectors not instructed to communicate with the device over the second channel during the overload period.

7. The system of claim 6 wherein the non-transitory instructions are sufficient for determining the interference threshold for each of the supporting sectors and the overloaded sector based on a relative distance to the next closest sector, the interference threshold being independently determined for each of the supporting sectors and the overloaded sector so as to prevent each from unduly interfering with the next closest sector.

8. The system of claim 1 wherein the non-transitory instructions are sufficient for:
 instructing the majority of the supporting sectors to transmit over an additional channel of the plurality of channels other than the first and second channels at a power level greater than a threshold; and
 instructing the overloaded sector and the supporting sectors to each transmit the second channel at a power level less than the threshold.

9. The system of claim 8 wherein the non-transitory instructions are sufficient for instructing the supporting sectors to each transmit the second channel at power levels sufficient for an aggregation of the power levels of all the second channels from the supporting sectors to be greater than the threshold.

10. The system of claim 1 wherein the non-transitory instructions are sufficient for instructing the supporting sectors and the overloaded sector to implement downstream parameters for downstream communications over the second channel, the downstream parameters specifying conditions at which downstream signals from the supporting sectors and the overloaded sector are to be communicated over the second channel in order to be synchronized at the device.

11. The system of claim 1 wherein the cells are configured to support cellular communications with the device.

12. The system of claim 1 wherein the cells are configured to support Wi-Fi communications with the device.

13. The system of claim 1 wherein the non-transitory instructions are sufficient for determining the overloaded sector to be one of the sectors where an available bandwidth at the first channel is below a desired minimum threshold.

14. The system claim 1 wherein the non-transitory instructions are sufficient for instructing the supporting sectors to communicate over an additional one of the plurality of channels while communicating over the second channel during the overload period.

15. The system of claim 1 wherein the non-transitory instructions are sufficient for instructing the device to cease communications with the supporting sectors after the overload period expires while continuing to communicate over the overloaded sector.

16. The system of claim 15 wherein the non-transitory instructions are sufficient for instructing the device to continue communicating with the overloaded sector over the first channel and not the second channel after the overload period expires, at least until the overloaded sector experiences another overload period.

17. The system of claim 15 wherein the non-transitory instructions are sufficient for instructing the device to continue communicating with the overloaded sector over the second channel and not the first channel after the overload period expires, at least until the overloaded sector experiences another overload period.

18. A computer-readable medium having code stored thereon which operates in cooperation with a processor to issue instructions to facilitate redistributing network capacity within a network having a plurality of base stations configured to predominately transmit over at least one of a plurality of primary channels, the computer-readable medium comprising non-transitory instructions to:

instruct a first plurality of the base stations to transmit over a secondary channel in order to increase network capacity at an area proximate a device; and implement signal compensation parameters to provide synchronized signaling exchange over the secondary channel between the first plurality of base stations and the device.

19. The computer-readable medium of claim 15 further comprising non-transitory instructions to select at least a majority of the first plurality of base stations to be the base stations not already transmitting over the secondary channel, thereby requiring at least the majority of the first flared base stations to simultaneously communicate over at least one of the primary channels and the secondary channel.

20. A non-transitory computer-readable medium having a plurality of instructions operable with a processor to facilitate redistributing network capacity within a network having a plurality of base stations configured to predominately transmit over one of a plurality of primary channels, the computer-readable medium comprising non-transitory instructions to:

identify secondary channels available for an area where a capacity increase is needed;

identify combinations of base stations capable of supporting the identified secondary channels at an aggregated signal strength greater than a threshold;

selecting one of secondary channels from the combinations to be used as an increase capacity channel in the area; and instruct a device in the area to transmit over the increased capacity channel.

\* \* \* \* \*